(12) United States Patent
Lin et al.

(10) Patent No.: US 12,711,272 B2
(45) Date of Patent: Aug. 18, 2026

(54) MASKING DATA USING DATA ANNOTATIONS

(71) Applicant: Salesforce, Inc., San Francisco, CA (US)

(72) Inventors: Chaney Lin, Palo Alto, CA (US); Fermin Ordaz, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 121 days.

(21) Appl. No.: 18/773,234

(22) Filed: Jul. 15, 2024

(65) Prior Publication Data

US 2026/0017410 A1 Jan. 15, 2026

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS 12,457,231 B1 * 10/2025 Erlingsson .............. G06F 9/545
12,463,995 B1 * 11/2025 Welsh ................... H04L 67/306
12,463,996 B1 * 11/2025 Welsh ................. G06F 16/9535
12,505,250 B1 * 12/2025 Tran .................... G06F 21/6245
2021/0256160 A1 * 8/2021 Hachey .................. G06N 20/20
2025/0307465 A1 * 10/2025 Fisher ................. G06F 21/6254
2025/0342351 A1 * 11/2025 Kolavennu ............. G06F 30/27
2025/0350455 A1 * 11/2025 Krstic ................. H04L 67/1008
2025/0350628 A1 * 11/2025 Murphy .............. H04L 63/1416
2025/0363311 A1 * 11/2025 Chandarana ........... G06Q 50/26
2025/0365320 A1 * 11/2025 Sadigh .................... G06F 40/30
2025/0371108 A1 * 12/2025 Ben-Shalom ....... G06F 18/2413
2025/0371189 A1 * 12/2025 Nijasure ................. G06F 21/62
2025/0377904 A1 * 12/2025 Fedoruk .............. G06F 21/6209
2025/0378268 A1 * 12/2025 Yarabolu ................. G06F 40/20
2025/0384160 A1 * 12/2025 Ardhanari ........... G06F 21/6254
2025/0390602 A1 * 12/2025 Tran .................... G06F 21/6245
2025/0391523 A1 * 12/2025 Aravamudan ......... G16H 10/60
2025/0392474 A1 * 12/2025 Gilchrist ............... H04L 9/3247
2026/0004110 A1 * 1/2026 Higgins ............... G06N 3/0475
2026/0010642 A1 * 1/2026 Roper, Jr. ............. G06F 21/604
2026/0010738 A1 * 1/2026 Gardner .................. G06F 40/56
2026/0010772 A1 * 1/2026 Kolavennu .......... G06N 3/0475

* cited by examiner

*Primary Examiner* — Stephen T Gundry
(74) *Attorney, Agent, or Firm* — Lee & Hayes, P.C.

(57) ABSTRACT

Techniques for masking data based on annotations are discussed herein. A system may receive a request to perform an action and leverage an LLM to assist in performing the requested action. When generating the input data to input to the LLM, the system can use a template to organize the input data. The template may include static data and/or slot(s) which can include a reference to data to input into such slots. The system may retrieve data to input to the slot based on the reference, retrieve annotations that define a classification of the data, and receive a policy that defines which types of data classifications are to be masked. Based on the data classification and the policy, the system can determine whether to mask the data. The system can generate the input data using the template, the data, and/or the mask(s) and input such data into the LLM.

20 Claims, 4 Drawing Sheets

MASKING DATA USING DATA ANNOTATIONS

TECHNICAL FIELD

Companies may use one or more systems and/or platforms to perform various tasks. In some cases, the companies may input data (e.g., company data, employee data, client data, etc.) into such systems and/or platforms. However, when requesting that the systems/or platforms perform an operation using such data, the operations may result an undesirable user experience.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
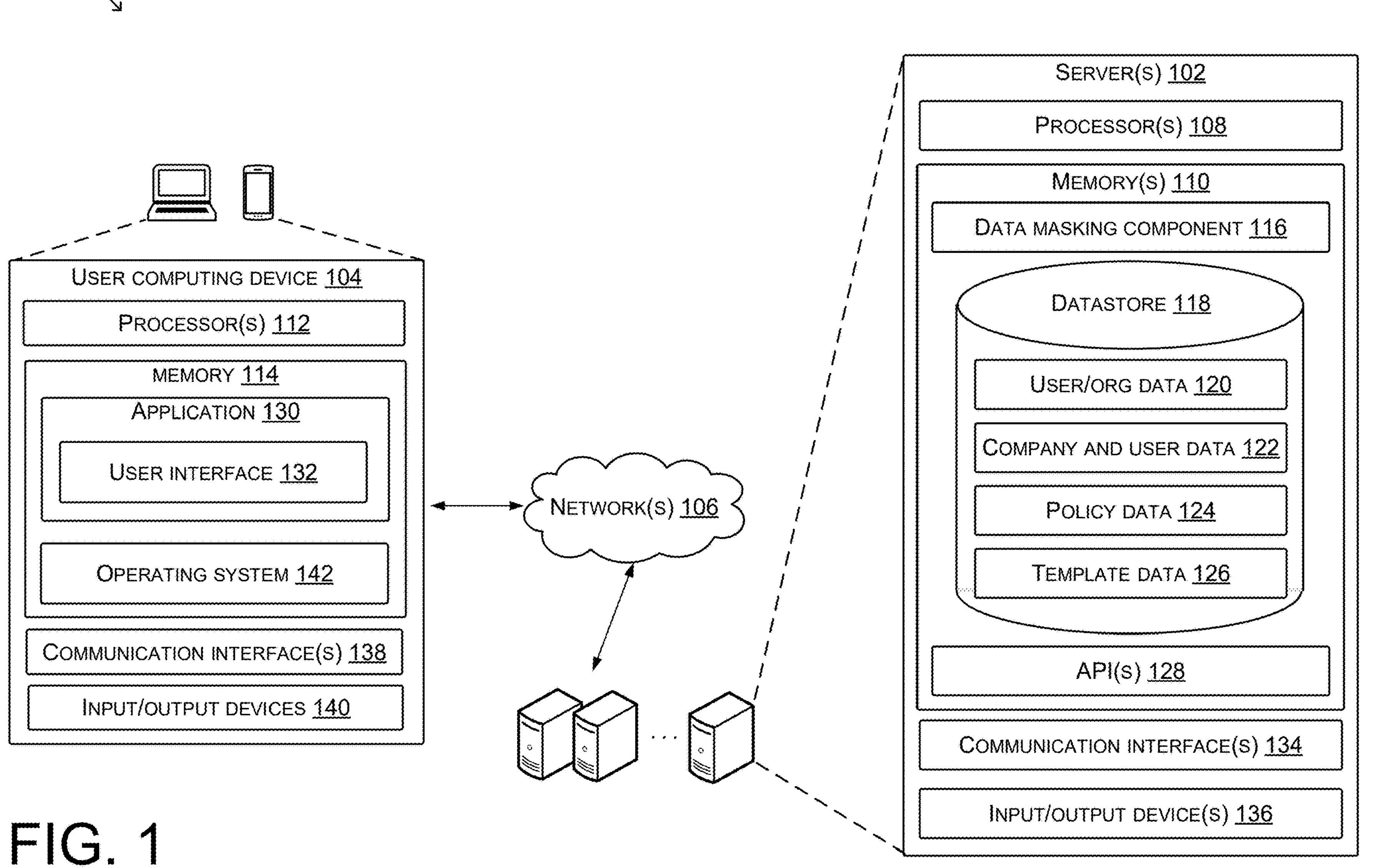
FIG. 1 illustrates an example system for performing techniques described herein.

Techniques for masking data based on annotations are discussed herein. As described throughout, systems can leverage annotations to identify and/or mask sensitive data such that the sensitive data is not input into a generative machine learned model. In some examples, a system may receive a request to perform an action. The system may leverage one or more generative machine learned models (hereinafter referred to as an "LLM") to assist in performing one or more aspects of the requested action. Accordingly, the system may generate data to input (e.g., input data) into the LLM. When generating the input data, the system can use a template to organize the input data. The template may include static data as well as one or more slots (e.g., placeholder for dynamic information) which can include a reference to data to input into such slots. Accordingly, the system may use the reference to determine a location in a database from which retrieve data to input into the slot. Based on identifying the data, the system may retrieve metadata (or annotations) that defines a classification (e.g., public, confidential, restricted, mission critical, internal, compliance, etc.) of the data. The system can further receive a policy that defines which types of data classifications are to be masked and which types of data classifications are allowed to be input directly into the LLM. Based on the data classification and the policy, the system can determine whether to mask the data. In some examples, the system can generate the input data based on the template, the data, and/or the mask. Based on generating the input data, the system can input the input data into the LLM which may be configured to output a response which may be presented to a virtual space. As discussed throughout this disclosure, the techniques may improve the user experience by increasing the ability of the system to mask sensitive data such that the sensitive data is not input to an LLM.

When using company and/or personal data to perform an action, it may be beneficial to mask (e.g., anonymize, obfuscate, hide, etc.) the sensitive data before inputting the data into an LLM. For example, companies (e.g., organizations) and/or users may rely on various systems to manage work and/or daily tasks. In such cases, the companies and/or users may input vast amounts of data (e.g., company data, personal data, employee data, client data, etc.) into the systems. The companies and/or users may request that the systems perform operations or actions using the data. Further, the systems may use one or more LLMs to assist in performing the requested actions. However, in some circumstances, the companies and/or users may not want certain types of data being input into the LLM(s). That is, in some situations, the data input by the companies and/or users may be sensitive data and as such, the companies and/or users may not want the LLM(s) using the sensitive data to train on and/or may want to keep such data secure. Accordingly, the systems and/or techniques described herein may improve security and/or confidentiality of sensitive data by masking the sensitive data such that the sensitive data is not input to the LLM(s).

To address these and other technical problems and inefficiencies, the systems and/or techniques described herein may include a data masking component (which also may be referred to as a "data masker" or "data masking system") configured to mask sensitive data using annotations. The technical solutions discussed herein solve one or more technical problems associated with inputting sensitive data into LLM(s) which may negatively impact the user experience by causing the user's sensitive data to be exposed to LLM(s).

In some examples, a system may receive a request for an LLM to perform an action. That is, a user profile may submit a request to the system for the system to perform an action. The user profile may submit the request by verbally commanding (e.g., speaking—audio data) the system to perform an action, interacting with a user device that uses the system (e.g., clicking or touching a user interface object within the system, typing and/or submitting text to a text entry box within the system, etc.), etc. In some examples, the request may include an instruction for the system (or LLM) to perform an action. The actions may include summarizing data, synthesizing data, generating documents, etc.

Based on receiving the request, the system may prepare (or generate) data to input (e.g., input data) into the LLM. That is, the system may generate input data that contains the information needed to perform the requested operation(s). As such, the system may receive and/or retrieve a template to organize the input data. A template may be a predefined organization of the data to input to the LLM. Further, the template may include static data and/or one or more slots. Slot(s) may be a placeholder for dynamic information. Further, slot(s) may include one or more reference(s) associated thereto that point to (or identify) a location in a database from which data can be retrieved to input into the slot. Alternatively or additionally, the reference(s) may identify a separate template with its own static data and/or slot(s) which, when filled out, may be positioned in the original slot location. In some examples, the system may identify the template based on the type of requested action. For example, the system may have multiple different templates that can be used based on the type of operation the system is to perform. That is, if the request is to generate documents regarding the financial records of a client, the system may identify the templates that correspond to generating financial documents for clients. Alternatively, if the request is to summarize business contracts with company clients, the system may identify the templates that correspond to summarizing business contracts.

Based on identifying the relevant template, the system may receive the data to input into the slot(s). As noted above, companies and/or users may input vast amounts and/or types of data into the system. In such cases, the data may be stored in a database and/or represented in tables. To organize the data, the companies and/or users may annotate the data by attaching (or otherwise associating) metadata (or annotations) to the tables (or rows, columns, and/or specific pieces of data). The annotations may classify the type data and/or provide additional information about the data. For example, the user may annotate the data at row 10 and column 15 as being internal data. Further, the user may annotate the data at row 1 and column 15 as being compliance data.

As such, when retrieving the data to input to the slot, the system may identify the reference associated with the slot. The reference may specify a table, a field, a record, an account, a client, a row, and/or a column from which to retrieve the data. Based on the reference, the system may identify the location in the database that corresponds to the reference and retrieve the data in the location.

Based on retrieving the data, the system may receive a classification of the data. That is, the system may retrieve the annotation that is associated with the data in the database. As noted above, the annotation may indicate the classification of the data. A classification may indicate a data sensitivity level (e.g., public, confidential, restricted, mission critical, internal, etc.), compliance (e.g., CCPA—California Consumer Privacy Act, COPPA—Children's Online Privacy Protection Act, etc.), etc. As such, the system may retrieve the annotation associated with the previously received data. As an example, the annotation may indicate that the data retrieved from the database has a classification of internal. That is, the data to insert into the slot has a classification of internal.

In some examples, the system may also receive a policy. A policy may indicate which data classifications to mask and which data classifications not to mask. That is, companies, admins, users, etc. may modify and/or dictate which classifications of data are to be masked such that the data is not input to the LLM. In some instances, the policy may be based on the LLM used by the system. For instance, the policy may indicate to mask some or all sensitive data based on sending the input data to a first model whereas the policy may indicate that some or all sensitive types of data do not need to be masked based on sending the input data to a second LLM. As such, the companies, admins, and/or users may set or otherwise determine the policy. In the case of a company (or organization), the policy may apply to some or all users requesting data that was input by the company and/or any data relevant to the company. As such, if an employee of a company requests that the system performs an operation, the system may retrieve the policy that was set by the employee's company.

In some examples, the system may determine whether to mask the data based on the classification and the policy. The system may mask the data if the policy includes the classification type. For example, if the classification type is internal and the policy defines masking restricted data, mission critical data, and CCPA data, the system may determine to refrain from masking the data and may input the data directly into the slot. In contrast, if the classification type is internal and the policy defines masking internal data, the system may determine a mask that anonymizes the data and input the mask into the slot. In some examples, when masking data, the system may maintain a mask to data mapping, such as a key-value pair. For example, if the data is a social security number, the system may generate a mask such as, <SNN> that is mapped to the actual social security number. The system may use the mapping when demasking the LLM output.

Additionally or alternatively, in some cases, the system can mask data based on a policy of a slot overriding the policy set by the company or user. That is, a slot may also include a policy that is unique from the policy assigned by the company and/or user. For example, the slot may include a policy to mask data with a classification of confidential, restricted, and internal while the company and/or user may generate a policy that masks data with a classification of confidential and restricted. As such, if the data classification is not covered by the company or user policy, the system may compare the data classification with the slot policy. Further, if the data classification is covered by the slot policy, the system may override the company or user policy with the slot policy and mask the data.

In some examples, the system may generate the input data based on the template, the data, and/or the masked data. That is, the input data may include the static content from the template, the data (in the slot) that is not to be masked, and the mask(s) in the slot(s).

Based on generating the input data, the system may input the input data to the LLM. As noted above, the system may include one or more generative machine learned models (e.g., LLMs) that may be trained to perform various system operations. In some cases, the system may train the LLMs to perform specific tasks. Accordingly, the system may input the input data into the LLM.

In some examples, the system may receive, from the LLM, output data (or a response). In some examples, the LLM may be trained to output a response. The output data (or response) may be a document, summary, recommendation, etc. Based on receiving the output data, the system may demask the masked data. That is, the system may use the key-value pairs (or mappings) to determine which content in the output data is masked data (e.g., key) and what data (e.g., value) to replace with the masked data. Accordingly, the system may generate modified output data that lacks masked data.

In some examples, the system may cause the output data (or the modified output data) to be output to the requesting user. The system may output the output data via displaying the output data on a user interface of a user device and/or causing a device to emit the output data via audio. That is, if the user requested the action via a user interface of a user device, the system may cause the output data to be displayed via the user interface. Further, if the user requested the action via speaking to a device, the system may cause the output to be emitted via audio. However, this is not intended to be limiting; in other examples, the system may emit the output via audio in response to the user requesting the action via a user interface and/or the system may cause the output data to be displayed via user interface in response to the user verbally requesting the action.

As illustrated by these examples, the techniques described herein can improve the functioning, efficiency, and overall user experience of the communication platform. That is, the techniques described herein may enable the system to use an LLM without inputting sensitive data therein. Further, the techniques may result in an increased and/or an enhanced user experience. Further, the techniques may result in increased processing speeds due to the system quickly determining which data to mask by retrieving annotations rather than processing the data via a separate system and/or LLM to identify the sensitive data.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

FIG. 1 illustrates an example environment 100 for performing the techniques described herein. The techniques discussed herein may be used in a variety of environments and for a variety of uses, although the examples given herein discuss a customer service environment as one of these use cases since it's a use case familiar to many. In additional or alternate examples, the computing environment may comprise computing devices used for sales-based systems, communication platforms, chat engines, cybersecurity, search engines, multi-agent/agentic machine-learned model pipeline(s) and/or cluster(s), machine-learned model training, cloud/distributed computing or massive computing efficient data storage and/or retrieval, and/or the like.

In at least one example, the example environment 100 can include one or more computing devices, such as server(s) 102 and/or a user computing device(s) 104. By way of example and not limitation, the server(s) 102 may be representative of servers for hosting the software, hardware, containers, and/or the like to implement at least part of the techniques discussed herein. For example, the server(s) 102 may host (e.g., store and/or execute) system software. The user computing device(s) 104 may be representative of user computing device(s) associated with a first user (i.e., a first "client device").

The server(s) 102 may comprise one or more individual servers or other computing devices that may be physically located in a single central location or may be distributed at multiple different locations. The server(s) 102 communication may be hosted privately by an entity administering all or part of the environment 100 (e.g., a utility company, a governmental body, distributor, a retailer, manufacturer, etc.), or may be hosted in a cloud environment, or a combination of privately hosted and cloud hosted services. In some examples, the functional components and/or data discussed herein can be implemented on a single server, a cluster of servers, a server farm or data center, a cloud-hosted computing service, a cloud-hosted storage service, and so forth, although other computer architectures can additionally or alternatively be used. Moreover, the server(s) 102 may comprise hardware and/or software containers accessible to different tenants with access to the server(s) 102.

The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (IoT) device, or any other computing device capable of sending communications and performing the functions according to the techniques described herein. In some examples, the user computing device(s) 104 may comprise distributed computing devices, server(s), etc.

In some examples, the server(s) 102 and/or user computing device(s) 104 may be configured to transmit network packages therebetween via network(s) 106. The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, cellular network, or any other such network, or any combination thereof. The network(s) 106 may comprise a single network or collection of networks, such as the Internet, a corporate intranet, a virtual private network (VPN), a local area network (LAN), personal area network (PAN), metropolitan area network (MAN), a wireless local area network (WLAN), a cellular network, a wide area network (WAN), a metropolitan area network (MAN), or a combination of two or more such networks, over which the user computing device(s) 104 may transmit a request to and/receive an output from the server(s) 102 via the communication platform. Components used for such communications can depend at least in part upon the type of network, the environment selected, or both. Further, the network(s) 106 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The server(s) 102 and the user computing device(s) 104 described herein may include one or more processors and/or memory. Specifically, in the illustrated example, server(s) 102 may include processor(s) 108 and memory 110 and user computing device(s) 104 include processor(s) 112 and memory 114.

By way of example and not limitation, the processor(s) 108 and/or 112 may comprise one or more central processing units (CPUs), graphics processing units (GPUs), tensor processing units (TPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions. For example, the processor(s) 108 and/or 112 can be one or more hardware processors and/or logic circuits of any suitable type specifically programmed or configured to execute the algorithms and processes described herein. The processor(s) 108 and/or 112 can be configured to fetch and execute computer-readable instructions stored in the computer-readable media, which can program the processor(s) to perform the functions described herein.

The memory 110 and/or 114 may comprise one or more non-transitory computer-readable media and may store software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, RAM, ROM, EEPROM, flash memory, optical storage, solid state storage, magnetic tape, magnetic disk storage, RAID storage systems, storage arrays, network attached storage, storage area networks, cloud storage, or any other medium for storing information. The architectures, systems, and individual elements described herein may include many other logical, programmatic, and physical components, of which those shown in the accompanying figures are merely examples that are related to the discussion herein. The memory 110 and/or 114 can be used to store any number of software/functional components that are executable by the processor(s) 108 and/or 112, respectively. In many implementations, these functional components comprise instructions or programs that are executable by the processor(s) 108 and/or 112 and that, when executed, specifically configure the processor(s) 108 and/or 112 to perform the actions server(s) 102 and/or user computing device(s) 104, according to the discussion herein.

For example, server(s) 102 may comprise a memory 110 storing the data masking component 116. As described throughout, the data masking component 116 may leverage annotations to identify and/or mask sensitive data such that the sensitive data is not input into a LLMs. In some examples, the data masking component 116 may receive a request to perform an action. The data masking component 116 may leverage one or more generative machine learned models (or LLMs) to assist in performing one or more aspects of the requested actions. Accordingly, the data masking component 116 may generate data to input (e.g., input data) into the LLM. When generating the input data, the data masking component 116 can identify a template to organize the input data. The template may include static data as well as one or more slots (e.g., placeholder for dynamic information) which include a reference to data to input into such slots. Accordingly, the data masking component 116 may use the reference to determine a location in a database from which retrieve data to input into the slot. Based on identifying the data, the data masking component 116 may retrieve metadata (or annotations) associated with the data that defines a classification (e.g., public, confidential, restricted, mission critical, internal, compliance, etc.) of the data. The data masking component 116 can further receive a policy that defines which types of data classifications are to be masked and which types of data classifications are capable of being input directly into the LLM. Based on the data classification and the policy, the data masking component 116 can determine whether to mask the data. In some examples, the data masking component 116 can generate the input data based on the template and the data or the mask included in the slot. Based on generating the input data, the data masking component 116 can input the input data into the LLM which may be configured to output a response which may be presented to the user profile.

The memory 110 may additionally or alternatively comprise a portion of memory 110 (e.g., one or more memories or a portion of a single memory) that collectively forms a datastore 118 (e.g., a database). In some examples, the datastore 118 can be integrated with the server(s) 102, as shown in FIG. 1. In other examples, the datastore 118 can be located remotely from the server(s) 102 and can be accessible to the server(s) 102 and/or user device(s), such as the user computing device(s) 104. The datastore 118 can comprise multiple databases, which can include user/org data 120, company and/or user data 122, policy data 124, and/or template data 126. Additional or alternative data may be stored in the data store and/or one or more other data stores.

In at least one example, the user/org data 120 can include permission data associated with permissions of individual users of the system or environment (e.g., sales-based platform, chat engine, search engine, etc.). In some examples, permissions can be set automatically or by an administrator of the platform, an employer, enterprise, organization, or other entity that utilizes the platform, a team leader, a group leader, or other entity that utilizes the platform for communicating with team members, group members, or the like, an individual user, or the like. Permissions associated with an individual user can be mapped to, or otherwise associated with, an account or profile within the user/org data 120. In some examples, such users can be defined by common access credentials, group identifiers, or the like, as described above.

In at least one example, the user/org data 120 can include data associated with one or more organizations of the platform. In at least one example, the user/org data 120 can store data in organization profiles, which can store data associated with an organization (or company), including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In some examples, the company and/or user data 122 may comprise any type of data that a company and/or user has input into server(s) 102 (or the system described above). As noted above, companies and/or users may input data (e.g., company data, user data, client data, employee data, personal data, financial data, etc.) that may be used within the system (or the server(s) 102). The company and/or user data 122 may be annotated such that some or all pieces of data may include a unique annotation that indicates a classification of the data.

In some examples, the policy data 124 may include one or more policies that have been set or otherwise generated by one or more companies, users, admins, and/or any other type of user. As noted above, the policy data 124 may include a list of one or more classifications that are to be masked such that the data associated with the classification is not input to the LLM.

In some examples, the template data 126 may include one or more different types of templates that may be used to organize data to input to the LLM. Further, the template data 126 may include static data and/or one or more slots which may be a placeholder for static data. The systems described herein may use slot information (e.g., reference data) to know which company and/or user data 122 to retrieve to input to the slot.

It will be appreciated that the terms "datastore," "database," "repository," and "network database" may be used interchangeably in areas of the present disclosure. As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. Moreover, data may be transmitted, received, or otherwise exchanged as individual "data objects" comprising interrelated data. Data objects may constitute single bits of data or large quantities of interrelated data, such as substantive data (e.g., the underlying content to be conveyed through a communication) and associated metadata (e.g., data not otherwise considered to be substantive data, encompassing characteristics of the substantive data and/or the relevant exchange (e.g., the identity of the user sending the data, the identity of the user receiving the data, the time/date when the data was sent, formatting to be associated with the exchanged substantive data, the file type of the data object, and/or the like).

The memory 110 may additionally or alternatively store application programming interface(s) (API(s) 128), hypervisor(s), container orchestration system(s), an operating system, and/or container (unillustrated). The API(s) 128 may expose back-end functions and/or services hosted by the server(s) 102 to the user computing device(s) 104 and/or different component(s) hosted by the server(s) 102 without transferring the functions/services/software to those computing device(s) and/or by accomplishing the functions and/or services at the server(s) 102. As relates to the instant discussion, this may comprise API(s) for receiving indications from a user (e.g., as part of an API call), or from different ones of the components.

In some examples, software executed at the user computing device(s) 104, such as a client application 130, may generate API call(s) to the API(s) 128 and/or any of the component(s) discussed herein may transmit call(s) to the API(s) 128 and/or receive responses from the API(s) 128. For example, a user interface 132 executed by a client application 130 may display actuatable/selectable options to request that the client application 130 perform an action. In some examples, the client application 130 may interface with the API(s) 128 to authenticate a user and grant or deny the user access to a portion of the datastore 118 and/or data masking component 116.

The memory 110 may additionally or alternatively an operating system and/or container. In some examples, one or more containers may be instantiated by a cloud orchestrator and may run the operating system and may execute one or more instances of the API(s) 128 and the data masking component 116 and may permit access to a portion of the datastore 118 according to permissions associated with a user and an organization associated with the container.

In some examples, the server(s) 102 may further comprise communication interface(s) 134, which can include one or more interfaces and hardware components for enabling communication with various other devices (e.g., the user computing device(s) 104), such as over the network(s) 106 or directly. In some examples, the communication interface(s) 134 can facilitate communication via WebSockets, APIs (e.g., using API calls), Hypertext Transfer Protocols (HTTPs), etc. The server(s) 102 can further be equipped with various input/output devices 136 (e.g., I/O devices). Such input/output devices 136 can include a display, various user interface controls (e.g., buttons, joystick, keyboard, mouse, touch screen, etc.), audio speakers, connection ports, and so forth.

In at least one example, the user computing device(s) 104 can include processor(s) 112, memory 114, communication interface(s) 138, and/or input/output device(s) 140. The memory 110 may store and execute a client application 130 and/or an operating system 142. In some examples, the client application 130 may be configured to authenticate a user to access data and/or services hosted by the server(s) 102. The API(s) 128 may filter the users and/or orgs accessible depending on permissions granted to a type of user profile and/or an organization associated with the user. In at least one example, a user profile to which a user authenticates can include permission data associated with permissions of individual users of the platform. In some examples, permissions can be set automatically or by an administrator of the platform, an employer, enterprise, organization, or other entity that utilizes the platform, a team leader, a group leader, or other entity that utilizes the platform for communicating with team members, group members, or the like, an individual user, or the like. Permissions associated with an individual user can be mapped to, or otherwise associated with, an account or profile. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the platform by maintaining security for limiting access to a defined group of users. In some examples, such users can be defined by common access credentials, group identifiers, or the like, as described above.

In some examples, the client application 130 may additionally or alternatively comprise instructions executable by one or more processors to provide a user interface 132. For example, the user interface 132 may comprise a graphical user interface (GUI), that the instructions may cause to be displayed via at least one of the input/output device(s) 140. In at least one example, the client application 130 can be a mobile application, a web application, a database interface (e.g., such as an application that presents a SQL or other database interface), or a desktop application. For example, a computing device of the one or more user computing device(s) 104 may access the API(s) 128 via a web browser or stand-alone application (either of which may be part of or host the client application 130) that communicates via network(s) 106 with API(s) 128.

In at least one example, the operating system 142 can manage the processor(s) 112, memory 114, hardware, software, etc. of the server(s) 102.

Figure 2:
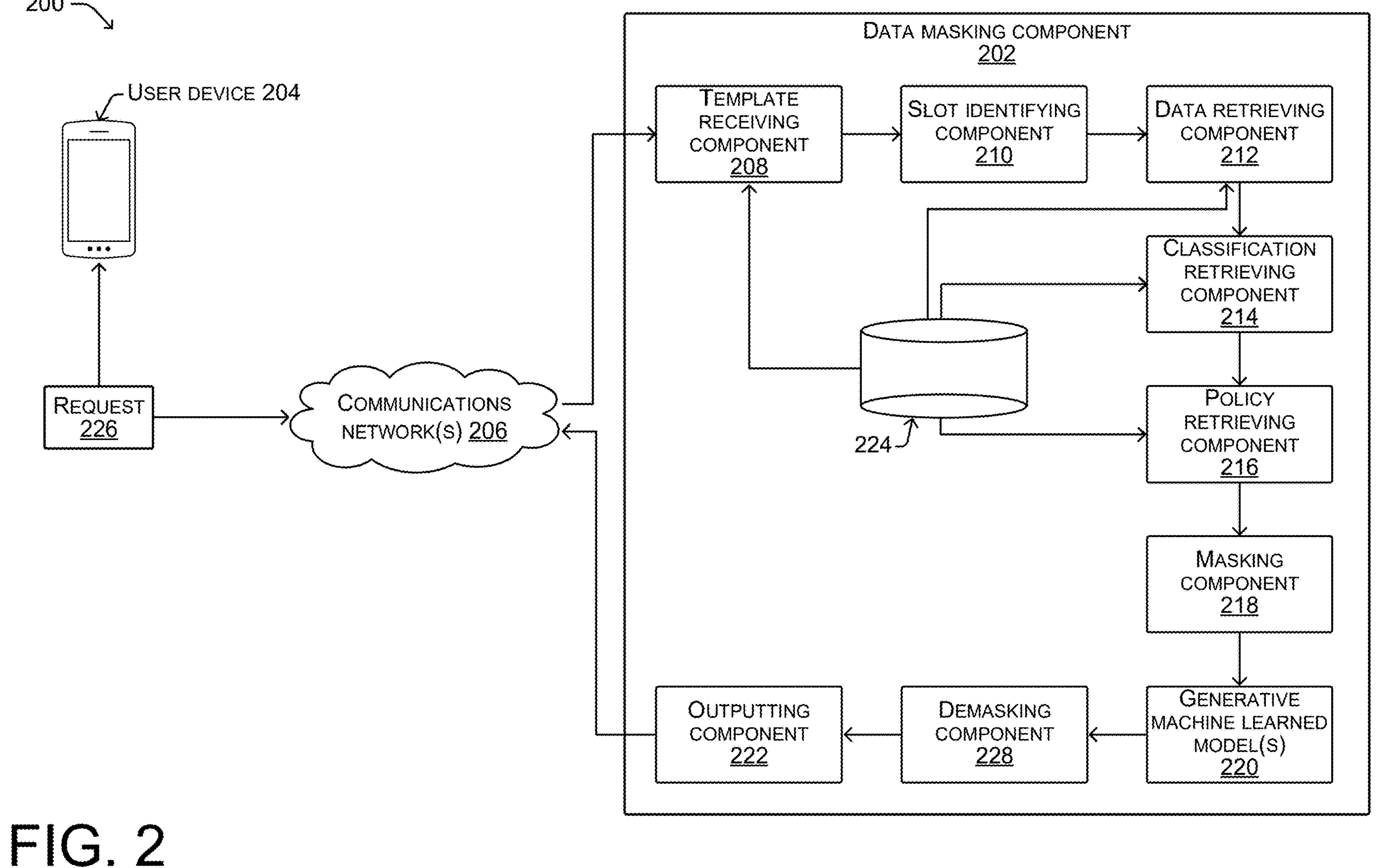
FIG. 2 depicts a block diagram illustrating the interactions of components of a data masking component configured to mask data such that the data is not input to a generative machine learned model.

FIG. 2 depicts a block diagram 200 illustrating the interactions of components of a data masking component 202 configured to mask data such that the data is not input to a generative machine learned model.

In some examples, the example block diagram 200 may be implemented with and/or in conjunction with a communication platform, search engine, sales-based platform, chatbot engine, and/or any other type of platform or system. In this example, the example block diagram 200 may include one or more user devices 204 configured to communicate with a communication platform via a communication network 206. Additionally, the example block diagram 200 may include a data masking component 202 configured to mask sensitive data using data annotations. The data masking component 202 may include a template receiving component 208 configured to receive a template to organize the input data, a slot identifying component 210 configured to identify the slot(s) associated with the template, a data retrieving component 212 configured to retrieve the data to input to the slot(s), a classification retrieving component 214 configured to receive a classification (or annotation) associated with the data, a policy retrieving component 216 configured to receive a policy to be applied to the data, a masking component 218 configured to mask data to be anonymized, a generative machine learned model(s) component 220 configured to perform various operations using one or more LLMs, a demasking component 228 configured to demask output from the generative machine learned model(s) component 220, and/or an outputting component 222 configured to cause the LLM output to be output via the user device 204.

In some examples, the example block diagram 200 may include one or more user devices 204 configured to communicate with a data masking component 202. The example block diagram 200 includes a user device 204. In this example, the user device 204 may be a mobile phone; however, in other examples, the user device 204 may be any other type of mobile device (e.g., wearable, tablet, etc.). In this example, the user device 204 may communicate with the data masking component 202 via the communication network(s) 106, as described in FIG. 1. In some examples, a user may use the user device 204 to send a request 226 to a system that includes the data masking component 202. In such cases, the request 226 may include user data (e.g., user profile, username, user role, user organization/company, etc.) and/or the requested action for the system to perform. In this example, the request 226 may include instructions for the system to perform a task that relies on an LLM. In such cases, the data masking component 202 may generate input data to input to the LLM while also ensuring that sensitive data is masked such that the sensitive data is not input to the LLM.

The data masking component 202 may include a template receiving component 208 configured to receive a template to organize the input data. The template receiving component 208 may analyze the request 226 to determine a type or subject of the request 226. Based on the type or subject of the request 226, the template receiving component 208 may retrieve a template from the database 224. The database 224 may store one or more templates that may be accessed by the template receiving component 208. In such cases, the template may include static data and/or one or more slot(s). The template receiving component 208 may send the template to the slot identifying component 210.

The data masking component 202 may include a slot identifying component 210 configured to identify the slot(s) associated with the template. As noted above, the slot may be a placeholder for dynamic data. Further, the slot may include a reference that points to a location of data to input to the slot position. Additionally or alternatively, the slot may include a reference to a second and different template that may include slots that are unique from the original slots. In such cases, the template may include one or more slots at various locations within the template. That is, in some examples, the slots may be interspersed with the static information of the template. Based on identifying the slot(s), the slot identifying component 210 may send the slot information to the data retrieving component 212.

The data masking component 202 may include a data retrieving component 212 configured to retrieve the data to input to the slot(s). That is, the data retrieving component 212 may receive the slot information (e.g., template, slot, reference information, etc.) from the slot identifying component 210 and/or any other component. As shown in FIG. 2, the data retrieving component 212 may use the reference information of the slot to retrieve data to input into the slot. That is, the data retrieving component 212 may identify a location within the database 224 that contains the data to input to the slot. Based on identifying the location, the data retrieving component 212 may retrieve the data from the location.

The data masking component 202 may include a classification retrieving component 214 configured to receive a classification (or annotation) associated with the data. As describe above, one or more users, admins, etc. may categorize (or annotate) the data that is within the database 224. When annotating the data, the users, admins, etc. may attach the classification (e.g., annotation) with the piece of data. For example, the admin may attach a classification of "internal" with the data at row 10 and column 5. As such, the classification retrieving component 214 may retrieve the classification attached to (or otherwise associated with) the data retrieved by the data retrieving component 212.

The data masking component 202 may include a policy retrieving component 216 configured to receive a policy to be applied to the data. As described above, one or more of admins, users, etc. may determine a policy that defines which classification(s) of data are to be masked such that the associated data is not input to the LLM. For example, an admin may set a policy for an organization that indicates that data with a classification type of internal, restricted, and confidential are to be masked. Additionally, the policy retrieving component 216 may identify a policy that corresponds to (or is attached with) the slot itself. That is, when the template is generated, the creator of the template may associate a policy with some or all of the slots. Further, the policies associated with the slots may override the policy set by the users, admins, etc. As such, the policy retrieving component 216 may send the policies to the masking component 218.

The data masking component 202 may include a masking component 218 configured to mask data that is to be anonymized. That is, the masking component 218 may evaluate the classification and the policies to determine whether to mask the data retrieved by the data retrieving component 212. The masking component 218 may mask data if the classification of the data is included in list of classifications in the policies. In contrast, if the classification type of the data is not included in the list of classifications in policies, the masking component 218 may not mask the data. For example, if the data classification is "internal" and the policy includes "internal" and "restricted," the masking component 218 may mask the data. In such cases, the masking component 218 may generate a mapping between the mask and the data. The mapping may be used by downstream components to demask the data after such data has been output by the LLM.

The data masking component 202 may include a generative machine learned model(s) component 220 configured to perform various operations using one or more LLMs. As noted above, the generative machine learned model(s) component 220 may include one or more LLMs that may be used to perform various tasks and/or operations. Accordingly, the generative machine learned model(s) component 220 may receive the input data (e.g., template data, data, mask data, etc.) and input the input data into an LLM. The LLM may be trained to output a response or output data. As shown, the generative machine learned model(s) component 220 may send the LLM output to the demasking component 228.

The data masking component 202 may include a demasking component 228 configured to demask output from the generative machine learned model(s) component 220. That is, the demasking component 228 may receive the LLM output from the generative machine learned model(s) component 220 and demask the output (e.g., masked data) by using the mapping generated by the masking component 218. In this case, by sending the masked LLM output to the demasking component 228, the data masking component 202 may ensure that the generative machine learned model(s) component 220 lacks the ability to access and/or utilize sensitive data of the user's and/or companies. As shown in FIG. 2, the demasking component 228 may send the demasked output to the outputting component 222.

The data masking component 202 may include an outputting component 222 configured to cause the demasked LLM output to be output via the user device 204. Based on receiving the output from the LLM (via the demasking component 228), the outputting component 222 may cause the response to be output to the user device 204. In some examples, the outputting component 222 may cause the response to be displayed via a user interface on the user device 204. In other examples, the outputting component 222 may cause the response to be output via audio on the user device 204.

Figure 3:
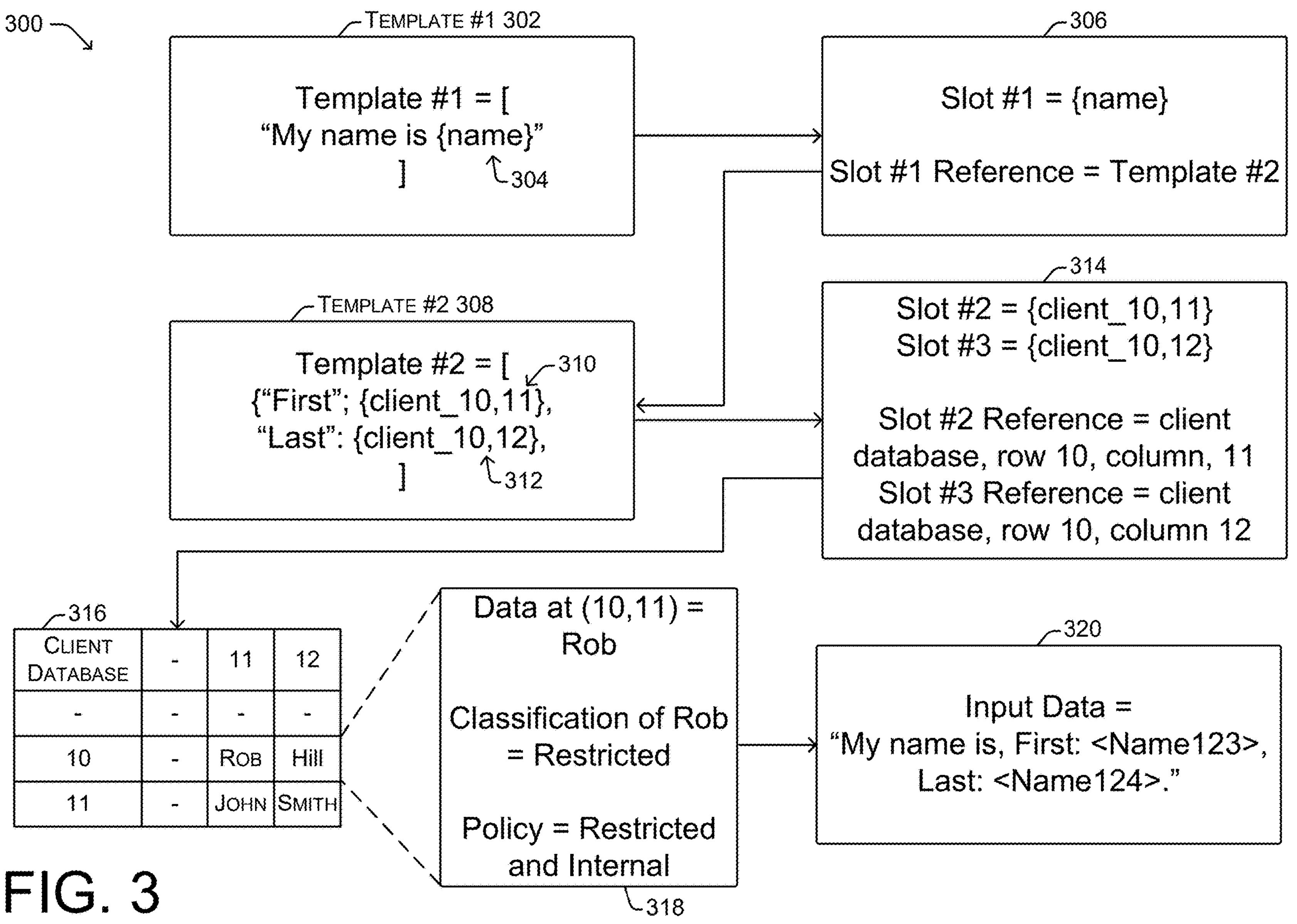
FIG. 3 illustrates a block diagram including an example template and/or slot with associated reference data.

FIG. 3 illustrates a block diagram 300 including an example template and/or slot with associated reference data. Specifically, FIG. 3 illustrates the relationship between templates, slots, and/or references of the slots.

In the example of FIG. 3, a user profile may have submitted a request for a system to perform an operation. As such, the system may determine that one or more LLMs may be used to fulfill or satisfy the request. In such instances, the system may generate data to be input to the LLM such that the request may be accurately and completely fulfilled. Accordingly and as described below, the system may receive a template, identify the slot(s) in the template, identify the reference(s) of the slot(s), and use the references to retrieve data and/or annotations (e.g., classification) from a database.

As shown, FIG. 3 includes a box 302 that includes template #1. In this example, the template #1 may include static data (or text) and a slot 304. That is, the static data of template #1 may be "My name is." Further, the slot 304 in template #1 may be "{name}." Accordingly, there is a single slot within template #1. In this example, the system may utilize reference data that may be attached to the slot 304 to determine from where to retrieve data to input to the slot 304.

FIG. 3 includes a box 306 that illustrates the slot information of template #1. As shown, box 306 illustrates that the slot 304 (e.g., "slot #1") from template #1 may be "{name}." The system may access and/or analyze information attached to the slot 304 to determine where to retrieve data to input to the slot 304. In this example, box 306 illustrates that the reference of slot 304 may be "template #2." That is, the slot 304 may point (or lead) the system to use template #2. Accordingly, the system may retrieve template #2 and fill out template #2. The filled out information of template #2 may be positioned within the same location as slot 304.

Based on determining that the reference of slot 304 points to template #2, the system may retrieve template #2. As shown, box 308 illustrates template #2 that includes static data and/or multiple slots. For example, template #2 includes static data that includes "First . . . , Last . . . " Further, the template #2 may include two slots which may be slot 310 and slot 312. Slot 310 may be "{client 10,11}" and slot 312 may be "{client 10,12}." Similarly to the slot 304 in template #1, the system may use reference data attached to slot 310 and slot 312 to determine what information to input into the slots.

FIG. 3 includes box 314 that illustrates the information associated with slot 310 and slot 312. As shown, box 314 illustrates that the slot 310 (e.g., "slot #2") from template #2 may be "{client 10,11}" and that the slot 312 (e.g., "slot #3") from template #2 may be "{client 10,12}." The system may analyze the reference data of the slots to determine where to retrieve the data from to input into the slots. In this example, box 314 illustrates that the reference of slot 310 may be a location that may be defined by the client database, row 10, and column 11. That is, the data that is in the client database at row 10 column 11 is the information to input to slot 310. Further, box 314 illustrates that the reference of slot 312 may be a location that may be defined by the client database, row 10, and column 11. Again, the data that is in the client database at row 10 column 12 is the information to input to the slot 312. As such, based on identifying the location of the data, the system may access the relevant database and retrieve the data.

As shown in FIG. 3, after identifying the location of the data to input to the slots, the system may access the relevant database 316 that includes the data. In this example, database 316 may be the client database which may include one or more types of data pertaining to one or more clients. As shown, the database may be represented as a table with rows and columns. However, this is not intended to be limiting; in other examples, the database may be represented in a different manner.

Based on accessing the database 316, the system may retrieve the data to input to slot 310 and slot 312. As for slot 310, the system may retrieve the data at row 10 and column 11 which, in this case, may be "Rob." Further, for slot 312, the system may retrieve the data at row 10 and column 12 which, in this case, may be "Hill." After retrieving the data, the system may retrieve annotation data (or classification data) which may define the classification of the data. That is, the system may determine a classification type of the data retrieved for slot 310 and slot 312. As shown, in box 318, the classification for "Rob," which is the data associated with slot 310, may be "restricted." The classification may be attached or otherwise associated with the data (e.g., "Rob") in row 10 and column 11.

To determine whether such data (e.g., "Rob") is to be masked, the system may retrieve a policy that was generated by one or more user profiles and/or administrators of the system and/or organization. As noted above, the policy may define which types of data classifications are to be masked. As shown, box 318 indicates that the policy associated with the request (e.g., request includes user data which may include organization data which may indicate the policy) includes an instruction to mask data classifications of "restricted" and "internal." As such, the system may mask the data if the data has a classification that overlaps with the policy. In this example, the classification of the "Rob" may be "restricted" which is a classification included in the policy. As such, the system may mask the data "Rob" and include the mask in the slot 310 instead of "Rob." For example, box 320 illustrates the input data to input to the LLM. The input data may be a combination of the template data, the data, and/or the mask data. As shown, the input data may include the static data from template #1 (e.g., "My name is") and the static data from template #2 (e.g., "First:" and "Last"). Further, the input data may include the mask <Name123> that corresponds to "Rob" and the mask <Name124> that corresponds to "Hill." Further, the information "First: <Name123>, Last: <Name124>" may be the data that is input to slot 304. Further, the information "<Name123>" may be the data that is input to slot 310 which may also correspond to the position of slot 304. The information "<Name124>" may be the data that is input to slot 312 which may also correspond to the position of slot 304. As such, when the input data is input to the LLM, the sensitive data (e.g., "Rob Hill") will not be input to the LLM.

Figure 4:
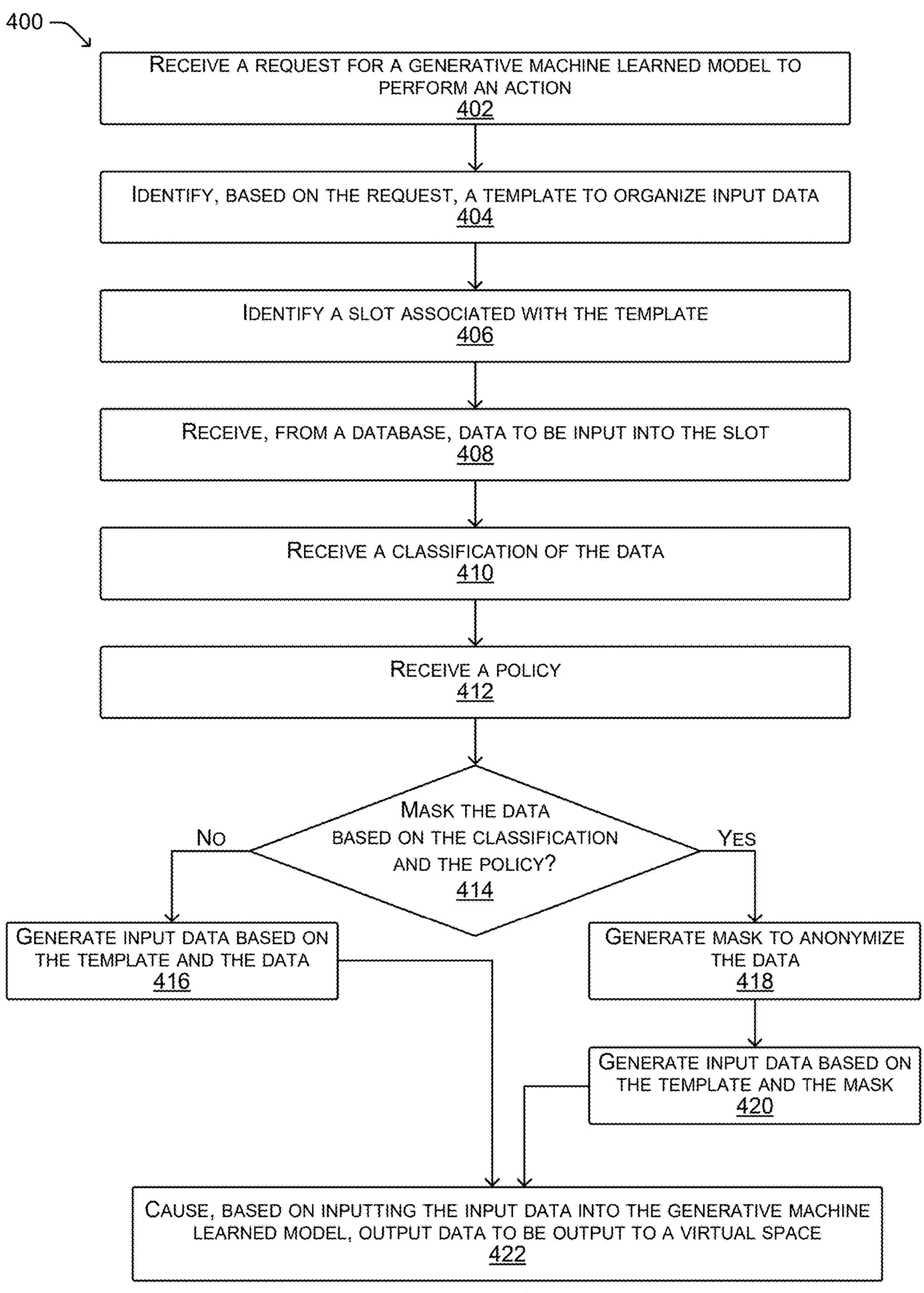
FIG. 4 is a flow diagram illustrating an example process of receiving a request for a generative machine learned model to perform an action, generating the data to input to the generative machine learned model, and outputting a response to a virtual space based on inputting the input data to the generative machine learned model.

FIG. 4 is a flow diagram illustrating an example process of receiving a request for a generative machine learned model to perform an action, generating the data to input to the generative machine learned model, and outputting a response to a virtual space based on inputting the input data to the generative machine learned model. The processes illustrated in FIG. 4 is described with reference to components described above with reference to the example environment 100 shown in FIG. 1 for convenience and ease of understanding. However, the processes illustrated in FIG. 4 is not limited to being performed using the components described above with reference to the example environment 100. Moreover, the components described above with reference to the example environment 100 are not limited to performing the processes illustrated in FIG. 4.

Process 400 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 402, the process 400 can include receiving a request for a generative machine learned model to perform an action. That is, a user profile may submit a request to the system for the system to perform an action. The user profile may submit the request by verbally commanding (e.g., speaking—audio data) the system to perform an action, interacting with a user device that uses the system (e.g., clicking or touching a user interface object within the system, typing and/or submitting text to a text entry box within the system, etc.), etc. In some examples, the request may include an instruction for the system (or LLM) to perform an action. The actions may include summarizing data, synthesizing data, generating documents, responding to a question or prompt, receiving data, etc.

At operation 404, the process 400 can include identifying, based on the request, a template to organize input data. Based on receiving the request, the system may prepare (or generate) data to input (e.g., input data) into the LLM. That is, the system may generate input data that contains the information needed to perform the requested operation(s). As such, the system may receive and/or retrieve a template to organize the input data. A template may be a predefined organization of the data to input to the LLM. Further, the template may include static data and/or one or more slots. In some examples, the system may identify the template based on the type of requested action. For example, the system may have multiple different templates that can be used based on the type of operation the system is to perform. That is, if the request is to generate documents regarding the financial records of a client, the system may identify the templates that correspond to generating financial documents for clients. Alternatively, if the request is to summarize business contracts with company clients, the system may identify the templates that correspond to summarizing business contracts.

At operation 406, the process 400 can include identifying a slot associated with the template. Slot(s) may be a placeholder for dynamic information. Further, slot(s) may include one or more reference(s) associated thereto that point to (or identify) a location in a database from which data can be retrieved to input into the slot. Alternatively or additionally, the reference(s) may identify a separate template with its own static data and/or slot(s) which, when filled out, may be positioned in the original slot location.

At operation 408, the process 400 can include receiving, from a database, data to be input into the slot. As such, when retrieving the data to input to the slot, the system may identify the reference associated with the slot. The reference may specify a table, a field, a record, an account, a client, a row, and/or a column from which to retrieve the data. Based on the reference, the system may identify the location in the database that corresponds to the reference and retrieve the data in the location.

At operation 410, the process 400 can include receiving a classification of the data. That is, the system may retrieve the annotation that is associated with the data in the database. As noted above, the annotation may indicate the classification of the data. A classification may indicate a data sensitivity level (e.g., public, confidential, restricted, mission critical, internal, etc.), compliance (e.g., CCPA—California Consumer Privacy Act, COPPA—Children's Online Privacy Protection Act, etc.), etc. As such, the system may retrieve the annotation associated with the previously received data. As an example, the annotation may indicate that the data retrieved from the database has a classification of internal. That is, the data to insert into the slot has a classification of internal.

At operation 412, the process 400 can include receiving a policy. A policy may indicate which data classifications to mask and which data classifications not to mask. That is, companies, admins, users, etc. may modify and/or dictate which classifications of data are to be masked such that the data is not input to the LLM. As such, the companies, admins, and/or users may set or otherwise determine the policy. In the case of a company (or organization), the policy may apply to some or all users requesting data that was input by the company and/or any data relevant to the company. As such, if an employee of a company requests that the system performs an operation, the system may retrieve the policy that was set by the employee's company.

At operation 414, the process 400 can include determining whether to mask the data based on the classification and the policy. The system may mask the data if the policy includes the classification type. For example, if the classification type is internal and the policy defines masking restricted data, mission critical data, and CCPA data, the system may determine to refrain from masking the data and may input the data directly into the slot. In contrast, if the classification type is internal and the policy defines masking internal data, the system may determine a mask that anonymizes the data and input the mask into the slot. In some examples, when masking data, the system may maintain a mask to data mapping, such as a key-value pair. For example, if the data is a social security number, the system may generate a mask such as, <SNN> that is mapped to the actual social security number. The system may use the mapping when demasking the LLM output. As such, if the data is not to be masked (414:No), the system may not mask the data. Further, at operation 416, the process 400 can include generating the input data based on the template and the data. The system may generate the input data by directly using the data retrieved from the database.

In contrast, if the data is to be masked (414:Yes), the system may generate a mask to anonymize the data. That is, at operation 418, the process 400 can include generating the mask to anonymize the data.

At operation 420, the process 400 can include generating the input data based on the template and the mask. The system may generate the input data by using the mask(s) of the data that is to be blocked. In such cases, the input data may include the template data, the mask data, and/or data associated with other slot(s) that is not to be masked.

At operation 422, the process 400 can include causing, based on inputting the input data into the generative machine learned model, output data to be output to a virtual space. Based on generating the input data, the system may input the input data to the LLM. As noted above, the system may include one or more generative machine learned models (e.g., LLMs) that may be trained to perform various system operations. In some cases, the system may train the LLMs to perform specific tasks. Accordingly, the system may input the input data into the LLM.

In some examples, the system may receive, from the LLM, output data (or a response). In some examples, the LLM may be trained to output a response. The output data (or response) may be a document, summary, recommendation, etc. Based on receiving the output data, the system may demask the masked data. That is, the system may use the key-value pairs (or mappings) to determine which content in the output data is masked data (e.g., key) and what data (e.g., value) to replace with the masked data. Accordingly, the system may generate modified output data that lacks masked data.

In some examples, the system may cause the output data (or the modified output data) to be output to the requesting user. The system may output the output data via displaying the output data on a user interface of a user device and/or causing a device to emit the output data via audio. That is, if the user requested the action via a user interface of a user device, the system may cause the output data to be displayed via the user interface. Further, if the user requested the action via speaking to a device, the system may cause the output to be emitted via audio. However, this is not intended to be limiting; in other examples, the system may emit the output via audio in response to the user requesting the action via a user interface and/or the system may cause the output data to be displayed via user interface in response to the user verbally requesting the action.

Example Clauses

A: A system comprising: one or more processors; and one or more non-transitory computer-readable media storing computer-executable instructions that, when executed, cause the one or more processors to perform operations comprising: receiving a request for a generative machine learned model to perform an action; generating, based at least in part on the request, input data to be input to the generative machine learned model, wherein generating the input data is based at least in part on: identifying, based at least in part on the request, a template to organize the input data; identifying a slot associated with the template; receiving, based at least in part on the slot and from a database, data to be input into the slot; receiving a classification of the data; receiving a policy; determining, based at least in part on the classification and the policy, a mask that anonymizes the data; causing the mask to be input into the slot; and generating, based at least in part on the mask and the template, the input data; inputting the input data into the generative machine learned model; receiving, from the generative machine learned model, output data; and causing the output data to be output to a virtual space.

B: The system of paragraph A, wherein the policy is a first policy that is associated with the slot, the operations further comprising: determining that the first policy includes a first instruction to mask content associated with the classification; receiving a second policy that is associated with the request, the second policy including a second instruction to refrain from masking content associated with the classification; and generating, based at least in part on the first policy overriding the second policy, the mask to anonymize the data.

C: The system of paragraph A, wherein receiving the data is further based at least in part on: identifying a reference associated with the slot; determining, based at least in part on the reference, a location in the database; and retrieving the data from the location in the database.

D: The system of paragraph A, wherein the template is a first template and the slot is a first slot, wherein receiving the data is further based at least in part on: determining that the first slot includes a first reference to a second template; determining that the second template includes a second slot; determining that the second slot includes a second reference to a location in the database; and retrieving the data from the location in the database.

E: The system of paragraph D, wherein the mask corresponds to the second slot and the first slot.

F: The system of paragraph A, wherein the template includes static content and one or more slots.

G: One or more non-transitory computer-readable media storing instructions executable by one or more processors, wherein the instructions, when executed, cause the one or more processors to perform operations comprising: generating input data to be input to a generative machine learned model, wherein generating the input data is based at least in part on: identifying a template to organize the input data; identifying a slot associated with the template; receiving, based at least in part on the slot and from a database, data to be input into the slot; receiving a classification of the data; receiving a policy; determining, based at least in part on the classification and the policy, a mask that anonymizes the data; causing the mask to be input into the slot; and generating, based at least in part on the mask and the template, the input data; and causing, based at least in part on the input data and the generative machine learned model, output data to be output to a virtual space.

H: The one or more non-transitory computer-readable media of paragraph G, wherein the policy is a first policy that is associated with the slot, the operations further comprising: determining that the first policy includes a first instruction to mask content associated with the classification; receiving a second policy that is associated with a user profile that requested for the generative machine learned model to perform an action, the second policy including a second instruction to refrain from masking content associated with the classification; and generating, based at least in part on the first policy overriding the second policy, the mask to anonymize the data.

I: The one or more non-transitory computer-readable media of paragraph G, wherein receiving the data is further based at least in part on: identifying a reference associated with the slot; determining, based at least in part on the reference, a location in the database; and retrieving the data from the location in the database.

J: The one or more non-transitory computer-readable media of paragraph G, wherein the template is a first template and the slot is a first slot, wherein receiving the data is further based at least in part on: determining that the first slot includes a first reference to a second template; determining that the second template includes a second slot; determining that the second slot includes a second reference to a location in the database; and retrieving the data from the location in the database.

K: The one or more non-transitory computer-readable media of paragraph J, wherein the mask corresponds to the second slot and the first slot.

L: The one or more non-transitory computer-readable media of paragraph G, wherein the template includes static content and one or more slots.

M: The one or more non-transitory computer-readable media of paragraph G, wherein generating the input data is further based at least in part on: receiving a request for the generative machine learned model to perform an action.

N: A method comprising: generating input data to be input to a generative machine learned model, wherein generating the input data is based at least in part on: identifying a template to organize the input data; identifying a slot associated with the template; receiving, based at least in part on the slot and from a database, data to be input into the slot; receiving a classification of the data; receiving a policy; determining, based at least in part on the classification and the policy, a mask that anonymizes the data; causing the mask to be input into the slot; and generating, based at least in part on the mask and the template, the input data; and causing, based at least in part on the input data and the generative machine learned model, output data to be output to a virtual space.

O: The method of paragraph N, wherein the policy is a first policy that is associated with the slot, further comprising: determining that the first policy includes a first instruction to mask content associated with the classification; receiving a second policy that is associated with a user profile that requested for the generative machine learned model to perform an action, the second policy including a second instruction to refrain from masking content associated with the classification; and generating, based at least in part on the first policy overriding the second policy, the mask to anonymize the data.

P: The method of paragraph N, wherein receiving the data is further based at least in part on: identifying a reference associated with the slot; determining, based at least in part on the reference, a location in the database; and retrieving the data from the location in the database.

Q: The method of paragraph N, wherein the template is a first template and the slot is a first slot, wherein receiving the data is further based at least in part on: determining that the first slot includes a first reference to a second template; determining that the second template includes a second slot; determining that the second slot includes a second reference to a location in the database; and retrieving the data from the location in the database.

R: The method of paragraph Q, wherein the mask corresponds to the second slot and the first slot.

S: The method of paragraph N, wherein the template includes static content and one or more slots.

T: The method of paragraph N, wherein generating the input data is further based at least in part on: receiving a request for the generative machine learned model to perform an action.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the one or more processors to perform operations comprising:

receiving a request for a generative machine learned model to perform an action;

generating, based at least in part on the request, input data to be input to the generative machine learned model, wherein generating the input data is based at least in part on:

identifying, based at least in part on the request, a predefined template to organize the input data;

identifying a slot associated with the predefined template;

receiving, based at least in part on the slot and from a database, data to be input into the slot;

receiving a classification of the data;

receiving a policy;

determining, based at least in part on the classification and the policy, a mask that anonymizes the data;

causing the mask to be input into the slot; and generating, based at least in part on the mask and the predefined template, the input data;

inputting the input data into the generative machine learned model;

receiving, from the generative machine learned model, output data; and causing the output data to be output to a virtual space.

2. The system of claim 1, wherein the policy is a first policy that is associated with the slot, the operations further comprising:

determining that the first policy includes a first instruction to mask content associated with the classification;

receiving a second policy that is associated with the request, the second policy including a second instruction to refrain from masking content associated with the classification; and generating, based at least in part on the first policy overriding the second policy, the mask to anonymize the data.

3. The system of claim 1, wherein receiving the data is further based at least in part on:

identifying a reference associated with the slot;

determining, based at least in part on the reference, a location in the database; and retrieving the data from the location in the database.

4. The system of claim 1, wherein the predefined template is a first predefined template and the slot is a first slot, wherein receiving the data is further based at least in part on:

determining that the first slot includes a first reference to a second predefined template;

determining that the second predefined template includes a second slot;

determining that the second slot includes a second reference to a location in the database; and retrieving the data from the location in the database.

5. The system of claim 4, wherein the mask corresponds to the second slot and the first slot.

6. The system of claim 1, wherein the predefined template includes static content and one or more slots.

7. One or more non transitory computer readable media storing instructions executable by one or more processors, wherein the instructions, when executed, cause the one or more processors to perform operations comprising:

generating input data to be input to a generative machine learned model, wherein generating the input data is based at least in part on:

identifying, from a plurality of templates, a template to organize the input data;

identifying a slot associated with the template;

receiving, based at least in part on the slot and from a database, data to be input into the slot;

receiving a classification of the data;

receiving a policy;

determining, based at least in part on the classification and the policy, a mask that anonymizes the data;

causing the mask to be input into the slot; and generating, based at least in part on the mask and the template, the input data; and causing, based at least in part on the input data and the generative machine learned model, output data to be output to a virtual space.

8. The one or more non transitory computer readable media of claim 7, wherein the policy is a first policy that is associated with the slot, the operations further comprising:

determining that the first policy includes a first instruction to mask content associated with the classification;

receiving a second policy that is associated with a user profile that requested for the generative machine learned model to perform an action, the second policy including a second instruction to refrain from masking content associated with the classification; and generating, based at least in part on the first policy overriding the second policy, the mask to anonymize the data.

9. The one or more non transitory computer readable media of claim 7, wherein receiving the data is further based at least in part on:

identifying a reference associated with the slot;

determining, based at least in part on the reference, a location in the database; and retrieving the data from the location in the database.

10. The one or more non transitory computer readable media of claim 7, wherein the template is a first template and the slot is a first slot, wherein receiving the data is further based at least in part on:

determining that the first slot includes a first reference to a second template;

determining that the second template includes a second slot;

determining that the second slot includes a second reference to a location in the database; and retrieving the data from the location in the database.

11. The one or more non transitory computer readable media of claim 10, wherein the mask corresponds to the second slot and the first slot.

12. The one or more non transitory computer readable media of claim 7, wherein the template includes static content and one or more slots.

13. The one or more non transitory computer readable media of claim 7, wherein generating the input data is further based at least in part on:

receiving a request for the generative machine learned model to perform an action.

14. A method comprising:

generating input data to be input to a generative machine learned model, wherein generating the input data is based at least in part on:

identifying, from a first database, a template to organize the input data;

identifying a slot associated with the template;

receiving, based at least in part on the slot and from a second database, data to be input into the slot;

receiving a classification of the data;

receiving a policy;

determining, based at least in part on the classification and the policy, a mask that anonymizes the data;

causing the mask to be input into the slot; and generating, based at least in part on the mask and the template, the input data; and causing, based at least in part on the input data and the generative machine learned model, output data to be output to a virtual space.

15. The method of claim 14, wherein the policy is a first policy that is associated with the slot, the method further comprising:

determining that the first policy includes a first instruction to mask content associated with the classification;

receiving a second policy that is associated with a user profile that requested for the generative machine learned model to perform an action, the second policy including a second instruction to refrain from masking content associated with the classification; and generating, based at least in part on the first policy overriding the second policy, the mask to anonymize the data.

16. The method of claim 14, wherein receiving the data is further based at least in part on:

identifying a reference associated with the slot;

determining, based at least in part on the reference, a location in the second database; and retrieving the data from the location in the second database.

17. The method of claim 14, wherein the template is a first template and the slot is a first slot, wherein receiving the data is further based at least in part on:

determining that the first slot includes a first reference to a second template;

determining that the second template includes a second slot;

determining that the second slot includes a second reference to a location in the second database; and retrieving the data from the location in the second database.

18. The method of claim 17, wherein the mask corresponds to the second slot and the first slot.

19. The method of claim 14, wherein the template includes static content and one or more slots.

20. The method of claim 14, wherein generating the input data is further based at least in part on:

receiving a request for the generative machine learned model to perform an action.

* * * * *